SIGNAL SYNCHRONIZING SYSTEM UTILIZING
ADJUSTABLE DELAY APPARATUS
Filed April 24, 1958

INVENTOR
G. P. DARWIN
BY
Kenneth B. Hamlin
ATTORNEY 3,008,087

SIGNAL SYNCHRONIZING SYSTEM UTILIZING ADJUSTABLE DELAY APPARATUS

George P. Darwin, Summit, N.J., assignor to Bell Telephone Laboratories, Incorporated, New York, N.Y., a corporation of New York Filed Apr. 24, 1958, Ser. No. 730,681
13 Claims. (Cl. 328—72)

Figure 1:
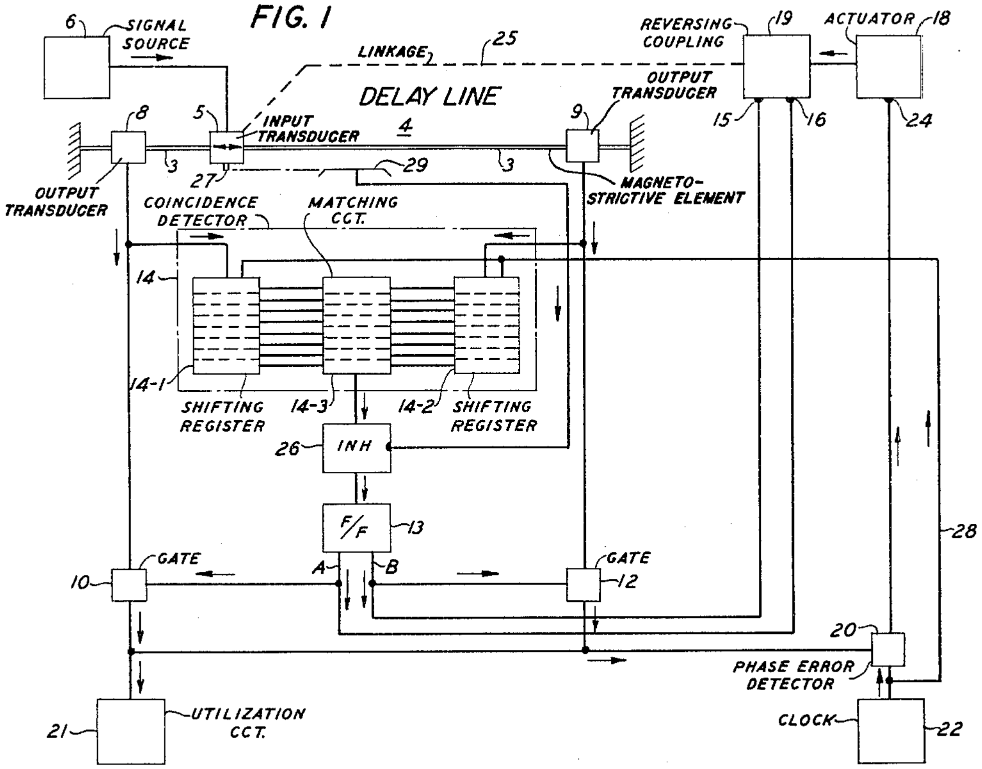

This invention relates to signal synchronization systems and more particularly to such systems employing variable delay lines.

In signal transmission and distribution systems interconnecting a plurality of transmitting and receiving terminals particular economic advantages may be obtained through the use of any of the various multiplexing techniques known in the art by means of which the signals may commonly share the same transmission path for some portion of their journey. Transmission path sharing may be accomplished on the basis of either time or frequency division. Associated with each such method are particular requirements for signal synchronization with basic carrier, gating or information bit frequencies. In time division multiplex, for example, each of a plurality of signalling terminals is assigned a time interval during which information may be interchanged between the signalling terminal and the common transmission path. Such information is conveniently represented by trains of binary pulses having a nominally constant bit rate. One synchronization problem arises due to variations in the propagation characteristics of the transmission path with temperature which variations affect the phase of transmitted signals. For example, gating circuits at the receiving end of the transmission path having been adjusted by a master clock to sequentially distribute the trains of incoming information bits among the receiving terminals for one set of ambient conditions may not properly assign all the information bits of successive pulse trains to their designated terminals under slightly altered ambient conditions which affect mean bit phase or arrival times.

A variable delay line operated by the deviations from nominal bit phase as determined by a master clock and which delay line is capable of compensating for phase deviations up to the maximum delay capacity for which it is designed is described in the copending application of W. A. Malthaner, Serial Number 706,358, filed December 31, 1957, now Patent No. 2,960,570. Where, however, cumulative phase shift effects arise due to a sustained frequency divergence from the nominal bit rate or through a variation therefrom of master clock frequency, the magnitude of required phase compensation soon exceeds that which can be efficiently provided in a line having only finite phase adjustment. Moreover, once the magnitude of required phase compensation exceeds the time interval equivalent to that taken to complete a distribution of information among all the receiving terminals, further delay may be indistinguishable in its compensatory effect from a lesser delay that would be sufficient to allow proper delivery of a complete pulse train to its designated receiving terminal. In view of this characteristic cyclically recurrent correspondence of information-bearing pulse trains with signalling terminals it is both possible and desirable in time division multiplex transmission to achieve signal synchronization through the control of minimal length delay lines.

Accordingly, it is an object of the present invention to provide an improved automatically adjusted signal delay line.

It is another object of the present invention to increase the effective delay obtainable from a delay line of finite dimensions.

It is still another object of the present invention to effect an improvement in pulse signal transmission systems.

It is still another object of the present invention to provide an adjustable delay line system for achieving phase correspondence between signals of different frequency.

In accordance with the principles of the present invention, in one aspect thereof, the continuous adjustment of a signal delay line is determined by a phase error signal. The error signal adjusts the delay line by means of a servo mechanism which changes the position of a transducer on the line. The phase error signal is derived, in one illustrative embodiment, by comparing a selected one of two complementarily delayed delay line output signals with a clock signal of reference phase. The two output signals are derived from two fixed output transducers located at either end of the delay line which has a servo-controlled, movable input transducer thereon. A change in the selection of delay line output utilized in this comparison is made upon detecting that condition of complementary delay variation wherein the delay difference between the output signals is an integral multiple of the period of the delayed signal. The change in selection of delay line output upon the occurrence of this condition is made from the output at greater delay to that at lesser delay when the delay line input is advancing in phase relative to the clock signal. Similarly, the change in selection is made from the delay line output at lesser delay to that at greater delay when the delay line input tends to lag in phase relative to the clock signal. Simultaneously with each such change in selection the sense of delay line adjustment is reversed so that the signal delay at the output of greater delay is decreased while the signal delay at the output of lesser delay is increased. In this manner the selected one of the delay line signal outputs is maintained in phase correspondence with the clock signals though there be a frequency difference between delay line input and clock signals.

It is a feature of the present invention that a signal synchronization device comprise a controllable signal transmission member defining a pair of complementarily adjusted signal delay paths over each of which a signal may be selectively delayed.

It is another feature of the present invention that the selected delay path be interchanged with the non-selected delay path and that the sense of delay path adjustment be reversed upon traversing a predetermined range of delay path adjustment.

It is still another feature of the present invention that the range of delay path adjustment be determined in accordance with the period of the delayed signal.

Figure 2:
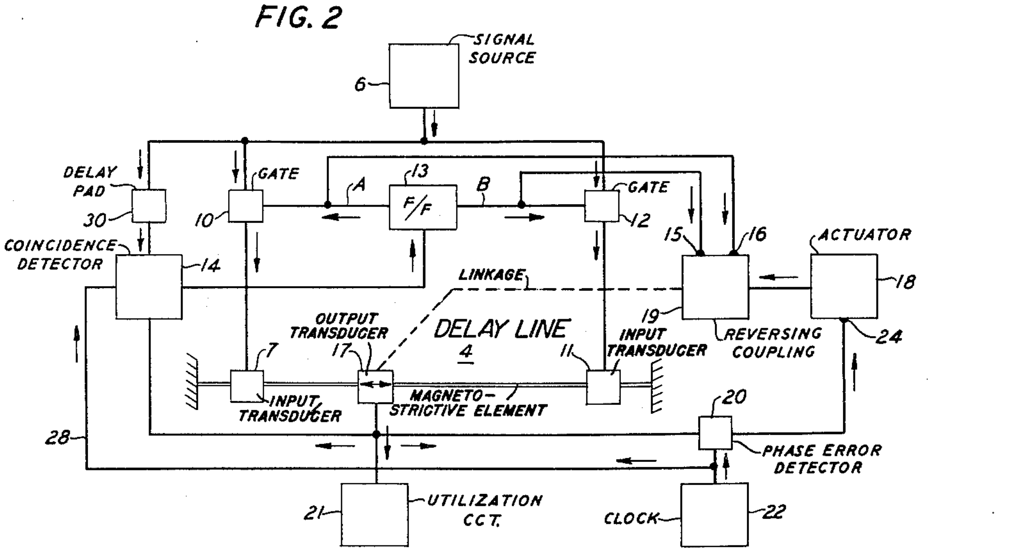

The foregoing and other objects and features of the present invention may be more readily understood from the following description of illustrative embodiments thereof when read with reference to the accompanying drawing, in which:

FIG. 1 schematically depicts one illustrative embodiment of a synchronizing system in accordance with the principles of this invention; and FIG. 2 schematically depicts another illustrative embodiment of a synchronizing system in accordance with the principles of this invention.

In FIG. 1 there is shown a signal synchronization system comprising an adjustable signal delay line 4 advantageously utilizing an ultrasonic transmission member 3 and having connected thereto a movable input transducer 5 for magnetostrictively launching ultrasonic impulses in member 3. A source of signal pulses 6, which source may comprise a signal transmission system employing time division multiplex signaling, is connected to input transducer 5. Disposed at either end of delay line 4 are stationary output transducers 8 and 9 for receiving and converting the ultrasonic impulses into electrical pulses. Gates 10 and 12 are respectively connected to transducers 8 and 9 and gates 10 and 12 are in turn alternately controlled by output leads A and B of a binary-connected flip-flop 13 operating as a counter. Binary-connected flip-flop 13 is actuated via inhibit gate 26 by coincidence detector 14 when the instantaneous signal delay between the input transducer 5 and one of the output transducers 8 or 9 is substantially one input signal period in excess of the instantaneous signal delay between the input transducer 5 and the other output transducer 9 or 8, respectively. When so actuated binary connected flip-flop 13 alternately delivers an actuating signal over leads A and B thereby alternately operating gates 10 and 12 and control terminals 15 and 16 of reversing coupling 19. The signal output obtained from the one of the gates 10 or 12 so actuated is coupled to phase-error detector 20 and utilization circuit 21. A phase-error signal is derived in phase-error detector 20 that is proportional to the phase difference between the signal from the actuated one of the gates 10 or 12 and the local clock 22. Among the phase-error detectors known in the art which advantageously may be utilized in this circuit is the phase-error detector disclosed in the above-cited copending application of W. A. Malthaner. The phase-error signal is coupled to the proportional control terminal 24 of actuator 18 which actuator 18 positions movable transducer 5 via reversing coupling 19 and linkage 25. Actuator 18 may advantageously comprise any of the varieties of reversible servomotors well-known in the art and linkage 25 accordingly indicates a suitably designed linkage or lead screw for imparting a translational motion to transducer 5. Reversing coupling 19 may advantageously comprise one of the well-known types of reversing gear boxes having a pair of solenoids respectively energized by terminals 15 and 16 to control the position of a reverse gear-shifting fork therein contained. Equally advantageous results may be obtained, for example, where actuator 18 is a two-phase servomotor, wherein terminal 24 is connected to one phase thereof and wherein reversing coupling 19 controls the connection of the other phase thereof to the power line through a phase reversing switch actuated by energization of terminals 15 and 16. Such actuator, linkage and reversing coupling techniques being so well known in the art, details thereof are, for the sake of simplicity, not shown in the drawing. Such details may be had by recourse to standard texts such as "Principles of Servomechanisms by Brown and Campbell, published by John Wiley & Co., N.Y. and "Computer Mechanisms and Linkages," M.I.T. Radiation Series, vol. 27, published by McGraw-Hill.

The sequence of system operation may be described by assuming gate 10 to be actuated so as to provide a signal path from output transducer 8 to phase-error detector 20. Any difference in phase between the signals applied to phase-error detector 20 will be applied to control terminal 24 of actuator 18 which actuator operating through reversing coupling 19 and linkage 25 repositions transducer 5 in such a manner as to eliminate the phase difference. Should a sustained trend of this phase difference be maintained for a sufficiently long interval, the maximum delay obtainable from the positioning of input transducer 5 will soon be introduced between source 6 and utilization circuit 21 at which point transducer 5 will be at its most remote distance from output transducer 8. Assuming however, that at this maximum delay point the delay difference between the outputs of transducers 8 and 9 is substantially equal to the duration of an integral number of signal periods of the signals supplied by source 6, which duration may be advantageously chosen as equal to one signal period, coincidence detector 14 detects the coincidence of signals that are one-signal period apart and actuates binary connected flip-flop 13.

While the particular details of coincidence detector 14 design may be advantageously determined in accordance with the characteristics of the signal supplied by source 6, one specific illustration of such design and signal characteristics will now be discussed by way of example of a time division multiplex signaling system employing pulse code modulation. In this illustrative system, source 6 supplies binary information bits at the rate of 0.65 microsecond per bit and also supplies at 125-microsecond intervals, an identification signal called a framing code which consists of a unique pattern of eight such bits. When no such unique framing code is available from signal source 6 the decision when to switch can be obtained from limit switches, not shown in the drawing, which will be actuated by the movable transducer at the end of its traverse. In FIG. 1 the coincidence detector 14 comprises two, eight-stage shifting registers 14–1 and 14–2, respectively. Each stage of each eight-stage shifting register is connected to an input of a match circuit 14–3. The eight-stage shifting registers 14–1 and 14–2 are advanced by receiving the clock signals from clock 22 via advance lead 28. When the framing code is simultaneously stored in each eight-stage shifting registers 14–1 and 14–2 match circuit 14–3 will operate and actuate binary connected flip-flop 13 via inhibit gate 26.

The actuation of binary connected flip-flop 13 removes the actuating signal from lead A and applies it to lead B to thereby de-energize gate 10 and terminal 16 of reversing coupling 19 and energize gate 12 and terminal 15 of reversing coupling 19. Energization of terminal 15 reverses the translational motion imparted to transducer 5. Energization of gate 12 serves to couple the signals present at output transducer 9 to phase comparator 20. As transducer 5 is moved away from output transducer 9 by linkage 25 the signals appearing at transducer 9 are received after undergoing a progressively increasing delay. The delay will continue to increase until the signals delivered from output transducer 9 to phase error detector 20 are in phase with the local clock signals from source 22. However, if phase coincidence with the local clock signals is not achieved before transducer 5 has been moved so as to insert a delay of one signal period between source 6 and utilization circuit 21, upon this latter condition occurring coincidence detector 14 will again actuate binary connected flip-flop 13 and flip-flop 13 will then transfer the actuating signal from lead B back to lead A thereby deactuating gate 12 and terminal 15 and reactuating gate 10 and terminal 16. In this manner the direction of transducer 5 translation is again reversed and signals appearing at output transducer 8 are now applied to phase error detector 20. A similar sequence of operations ensues when the phase difference between either of the transducer outputs and the local clock signal is such that a sustained or progressively decreasing phase difference is maintained.

It will be noted that in addition to the above-described circuitry there is provided on the movable transducer 5 a wiper 27 which engages slide contact 29 to inhibit the operation of binary connected flip-flop 13 by operation of inhibit gate 26 when the movable input transducer 5 is midway between transducers 8 and 9. It is apparent that the signals appearing at transducers 8 and 9 will be in phase coincidence at this time and since no reversal in the motion of transducer 5 is desired the operation of binary connected flip-flop is inhibited by the actuation of the inhibit gate 26 to prevent any signal output of coincidence detector 14 from reaching binary connected flip-flop 13.

In summary, wherever it is required to increase the signal delay beyond that equivalent to a signal period of signal source 6, the direction of transducer translation as well as the particular transducer output is reversed. It should be noted that each time the movable transducer 5 reaches its maximum excursion from the respective output transducer being utilized the above-described switching results in the omission of one complete signal period, and similarly, the repetition of a signal period is effected whenever this switching occurs for the condition of progressively decreasing delay.

While a signal synchronization system has been shown utilizing an adjustable delay line having a single movable input transducer and two fixed output transducers it will be apparent that equally advantageous results may be obtained where the input transducer is fixed and the output transducers are movable.

It is an advantage of the circuit of FIG. 1 due to the comparison of delay line outputs by coincidence detector 14 that any temperature variation of magnitude normally encountered in magnetostrictive delay line systems is ineffective to impair the accuracy of system operation. Any variation in ambient temperature similarly affects both signal paths through delay line 4.

In FIG. 2 an alternate embodiment of a phase compensation apparatus is shown that is somewhat similar to that shown in FIG. 1 except that the gates 10 and 12 and the binary connected flip-flop 13 are positioned between the signal source 6 and delay line input transducers 7 and 11 rather than between the delay line 4 and utilization circuit 21. In addition the actuator 18 positions a movable output transducer 17 rather than the movable input transducer 5 and the coincidence detector 14 operates binary connected flip-flop 13 upon detecting a coincidence of signals between output 17 and signal source 6 rather than a signal coincidence between output transducers 8 and 9. In this embodiment while alternate signal paths are provided through delay line 4 upon the respective actuation of gates 10 or 12, there is no possibility of signal coincidence when movable transducer 17 is at the mid-range of its traverse as is the case in FIG. 1 where alternate signal paths through delay line 4 are provided. Thus, it is an advantage of the embodiment of FIG. 2 that the inhibiting gate 26 is not required to inhibit the operation of binary connected flip-flop 13 at the midpoint of delay line 4.

In a system utilizing transducers having a minimum realizable linear dimension some residual delay may remain at the end of traverse of the movable transducer 17 and the adjacent one of the input transducers 7 or 11. This residual delay may be compensated for by inserting a delay pad equal to the residual delay between the signal source 6 and the coincidence detector 14. Such a delay pad is shown in FIG. 2 and designated 30.

It is to be understood that the above-described arrangements are illustrative of the application of the principles of the invention. Numerous other arrangements may be devised by those skilled in the art without departing from the spirit and scope of the invention.

What is claimed is:

1. In a signal delay apparatus the combination comprising a source of signal pulses, a signal delay element, input means for coupling signals from said source to said element, output means connected at each end of said element for receiving said signals, and signal responsive means connected to each of said output means for controlling said signal delay element.

2. The combination defined in claim 1 wherein said signal delay element comprises a magnetostrictive delay line and wherein said input means comprises a movable transducer thereon.

3. The combination defined in claim 2 further including a source of reference pulses for actuating said signal responsive means.

4. The combination defined in claim 3 wherein said signal responsive means comprises phase comparator means coupled to said source of reference pulses, switching means for alternately connecting each of said output means to said phase comparator means, and pulse coincidence detector means connected between said output means for actuating said switching means.

5. The combination defined in claim 4 further including actuator means controlled by said phase comparator means for determining the position of said movable transducer.

6. A signal delay system comprising a signal source, a finitely adjustable signal delay line having input and output means, means for coupling said signal source to said input means, a reference signal source, signal responsive means connected between said reference signal source and said output means, actuator means controlled by said signal responsive means for adjusting said delay line, and means operative at each limit of delay line adjustment to reverse said actuator means.

7. The combination defined in claim 6 wherein said delay line input means includes a transducer at each end of said delay line and wherein said means coupling said signal source to said input means comprises a pair of gate means alternately controlled by said means operative at each limit of delay line adjustment.

8. The combination defined in claim 7 wherein said means operative at each limit of delay line adjustment comprises pulse coincidence detector means connected between said signal source and said output means and single stage binary counter means interconnecting said detector means and each of said gate means.

9. In a frequency matching device the combination comprising a first and a second signal source, a pair of complementarily adjustable signal delay paths, means for coupling said first signal source to each of said delay paths, phase comparator means coupled to said second signal source, switching means for selectively coupling either of said delay paths to said phase comparator means, and means responsive to said phase comparator means for adjusting said signal delay paths.

10. The combination defined in claim 9 wherein said signal delay paths include a magnetostrictive delay element and wherein said means for coupling said first signal source to each of said delay paths comprises an input transducer for launching pairs of oppositely directed pulse trains in said magnetostrictive element.

11. The combination defined in claim 10 further including output means associated with each of said delay paths for actuating said switching means in response to a predetermined signal coincidence of said oppositely directed pulse trains.

12. An adjustable signal delay line comprising an ultrasonic delay line having input and output transducer means defining a pair of adjustable delay line paths, a source of information signals, a source of clock signals, means including gating means for detecting time differences between said clock signals and said information signals applied over either of said delay line paths, means connected to said detector means for adjusting the length of said delay line paths, and means for reversing the adjustment of the length of said delay line paths on occurrence of a predetermined time difference between said information and said clock signals.

13. An adjustable signal delay line in accordance with claim 12 further comprising means connected to said gating means causing said information signals to be applied to said detector means over one of said delay line paths initially and to said detector means over the other of said delay line paths after occurrence of said predetermined time difference between said information and clock signals.

References Cited in the file of this patent

UNITED STATES PATENTS

| | | |
|---|---|---|
| 2,828,478 | Johnson | Mar. 25, 1958 |
| 2,863,121 | Powell | Dec. 2, 1958 |
| 2,899,553 | Horton | Aug. 11, 1959 |

FOREIGN PATENTS

| | | |
|---|---|---|
| 1,126,885 | France | July 30, 1956 |